United States Patent
Kappelmüller et al.

(10) Patent No.: US 6,986,657 B2
(45) Date of Patent: Jan. 17, 2006

(54) INJECTION MOLDING APPARATUS

(75) Inventors: Werner Kappelmüller, Schwertberg (AT); Franz Dirneder, Schwertberg (AT); Stefan Eppich, Schwertberg (AT)

(73) Assignee: Engel Austria GmbH, Schwertberg (AT)

( * ) Notice: Subject to any disclaimer, the term of this patent is extended or adjusted under 35 U.S.C. 154(b) by 121 days.

(21) Appl. No.: 10/390,985

(22) Filed: Mar. 18, 2003

(65) Prior Publication Data

US 2003/0180413 A1 Sep. 25, 2003

(30) Foreign Application Priority Data

Mar. 20, 2002 (AT) .......................................... A 425/2002

(51) Int. Cl.
*B29C 45/64* (2006.01)

(52) U.S. Cl. .................. 425/590; 425/451.2; 425/451.7
(58) Field of Classification Search ................ 425/589, 425/590, 595, 451.2, 451.7
See application file for complete search history.

(56) References Cited

U.S. PATENT DOCUMENTS

| | | | | |
|---|---|---|---|---|
| 4,797,086 A | * | 1/1989 | Adachi | 425/589 |
| 4,984,980 A | * | 1/1991 | Ueno | 425/595 |
| 6,186,770 B1 | * | 2/2001 | Ziv-Av | 425/590 |

FOREIGN PATENT DOCUMENTS

| | | |
|---|---|---|
| DE | 2102722 | 1/1971 |
| DE | 43 29 070 C2 | 10/1993 |
| JP | 1314128 | 12/1989 |

* cited by examiner

*Primary Examiner*—James P. Mackey
(74) *Attorney, Agent, or Firm*—Notaro & Michalos P.C.

(57) ABSTRACT

Injection molding apparatus with a stationary mold clamping plate and a moveable mold clamping plate as well as shafts fixed to one mold clamping plate and passing through openings in the other mold clamping plate, at least one of which has at least one thread on its free end, whereby at least on this free end of the one shaft a drive nut as well as an additional nut for the transmission of the closing force are arranged.

16 Claims, 6 Drawing Sheets

INJECTION MOLDING APPARATUS

Figure 1:
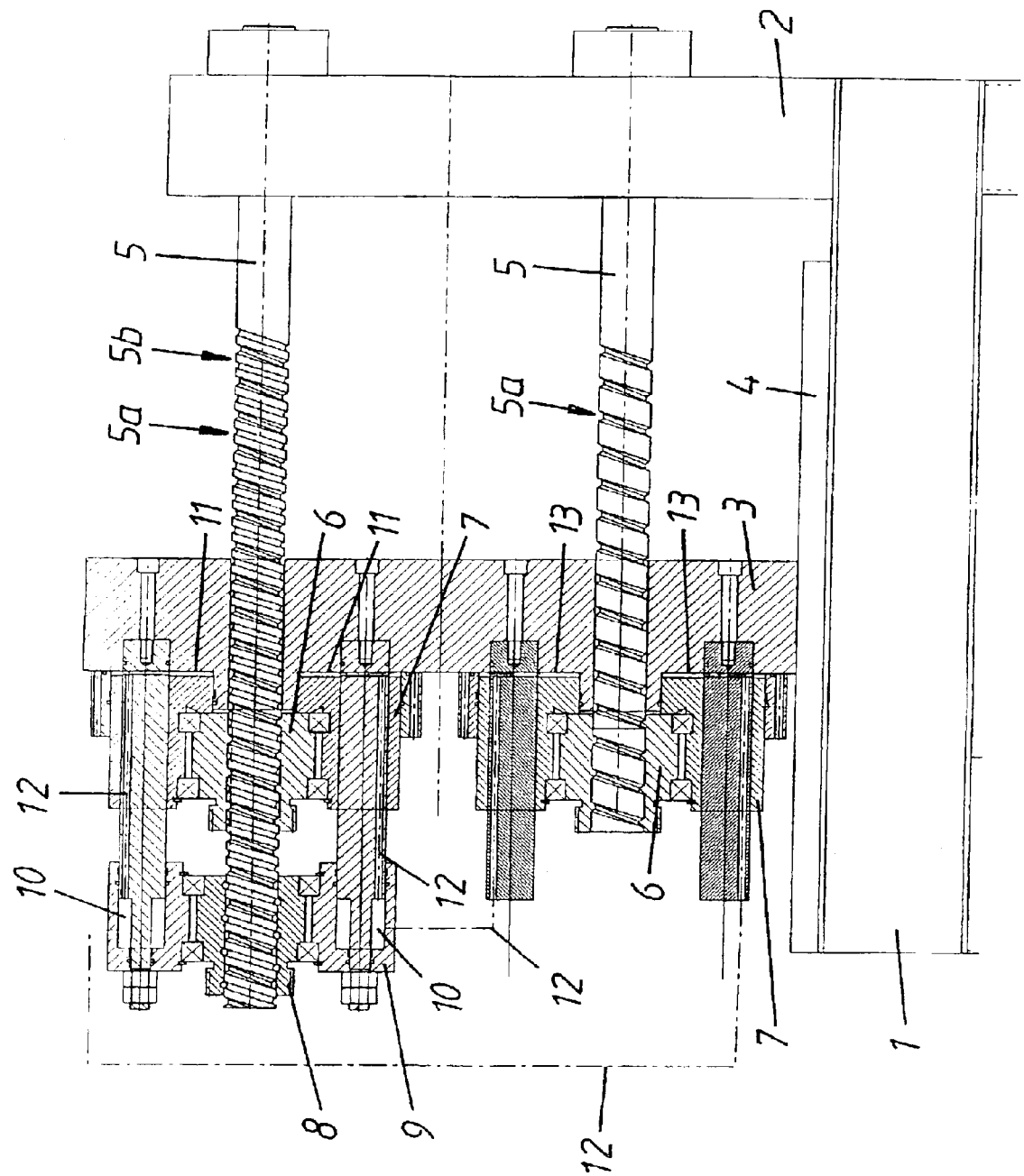

The present invention relates to an injection moulding apparatus with a stationary mould clamping plate and a moveable mould clamping plate as well as shafts fixed to one mould clamping plate and passing through openings in the other mould clamping plate.

Such injection moulding apparatus are usually designated 2-plate machines. They generally have a drive for the so-called rapid stroke, during which the moveable and stationary mould clamping plates are moved relatively towards one another and away from one another, the mould halves held by the mould clamping plates being closed and opened. If the mould has reached the closed state, the mould clamping plate passed through by the shafts is locked with the shafts, so that for example the closing pressure can be applied via pressure pads.

In this connection the object of the present invention is to provide a space-saving and simple solution for the rapid stroke and the application of the closing force.

This is achieved according to the invention in that at least one of the shafts has at least one thread on its free end, whereby at least on this free end of the one shaft a drive nut as well as an additional nut for the transmission of the closing force are arranged.

The drive nut arranged directly on at least one shaft saves having a separate rapid-stroke spindle, as is usual in the state of the art. The additional nut provided in addition to the drive nut enables an optimal adjustment of the nuts to the task assigned to them. Thus it is preferably provided that the drive nut is formed as a recirculating ball nut whereas the nut for the application of the closing force has a fixed thread, in particular a trapezoidal thread. The recirculating ball nut guarantees a largely friction-free, quick rapid stroke, whereas the nut with the fixed thread offers sufficient contact surface on the thread to transmit the high closing forces without deformation.

For simple machining of the shaft it is favourable if the drive nut and the additional nut for the transmission of the closing force engage in a shared thread on the shaft.

A preferred embodiment provides that the drive nut is housed rotatable in the cylinder housing of a pressure transmitter. By this construction the drive nut can be used simultaneously to produce the closing force. It is favourable if the nut for the transmission of the closing force is housed rotatable on the piston of at least one pressure pad, which can have pressure applied to it by the drive nut housed in the cylinder housing of a pressure transmitter.

A particular version provides that the drive nut and the nut for the transmission of the closing force can be coupled, so that only one drive has to be provided. However it is also possible to dispense with the coupling device, provided that each of the nuts is provided with its own drive.

It is favourable, for the purpose of a symmetrical force application, if the combination of drive nut and nut for the transmission of the closing force is provided not only on one shaft, but on two shafts arranged diagonally to one another or even on all the shafts.

Figure 2:
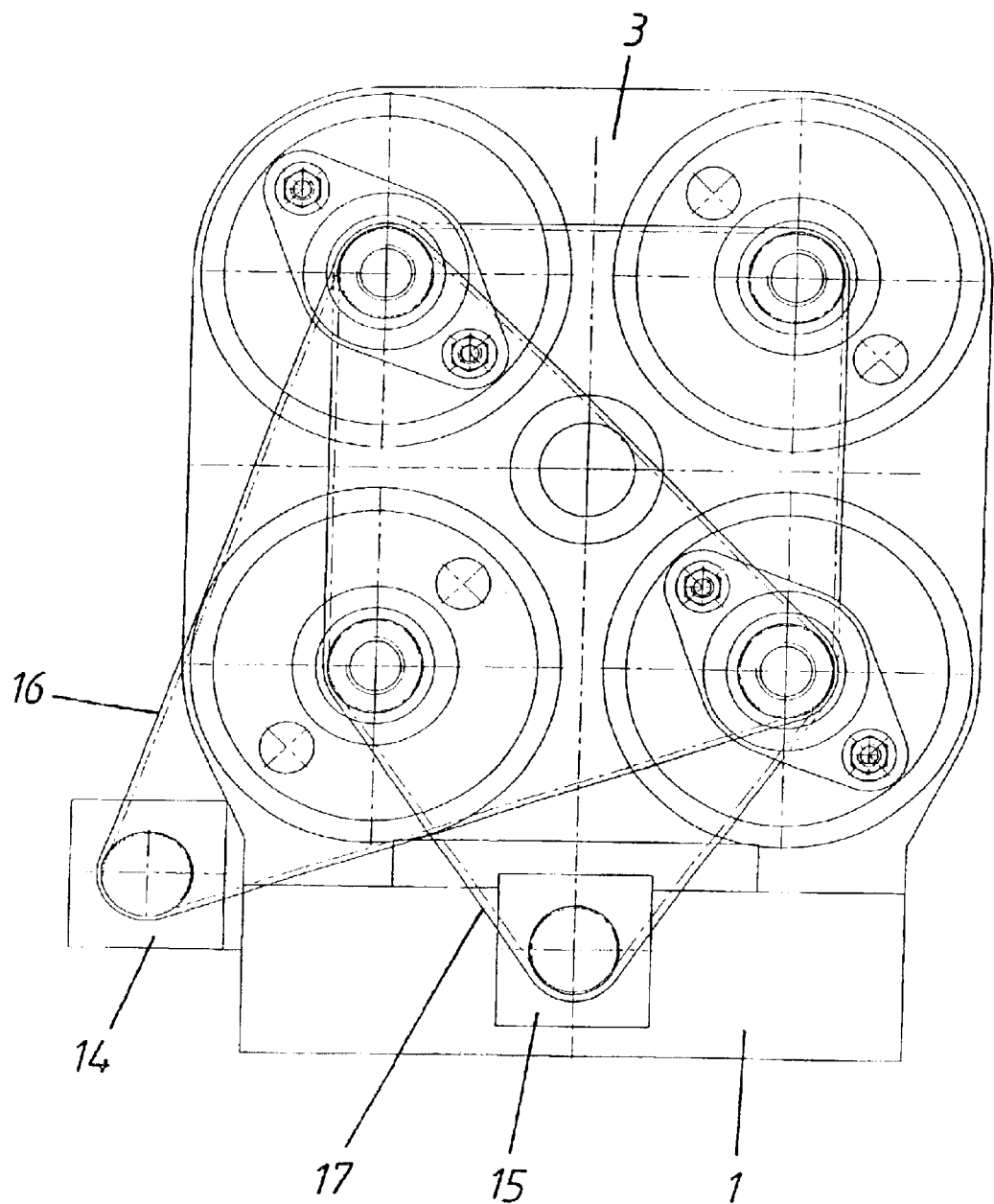
Figure 3:
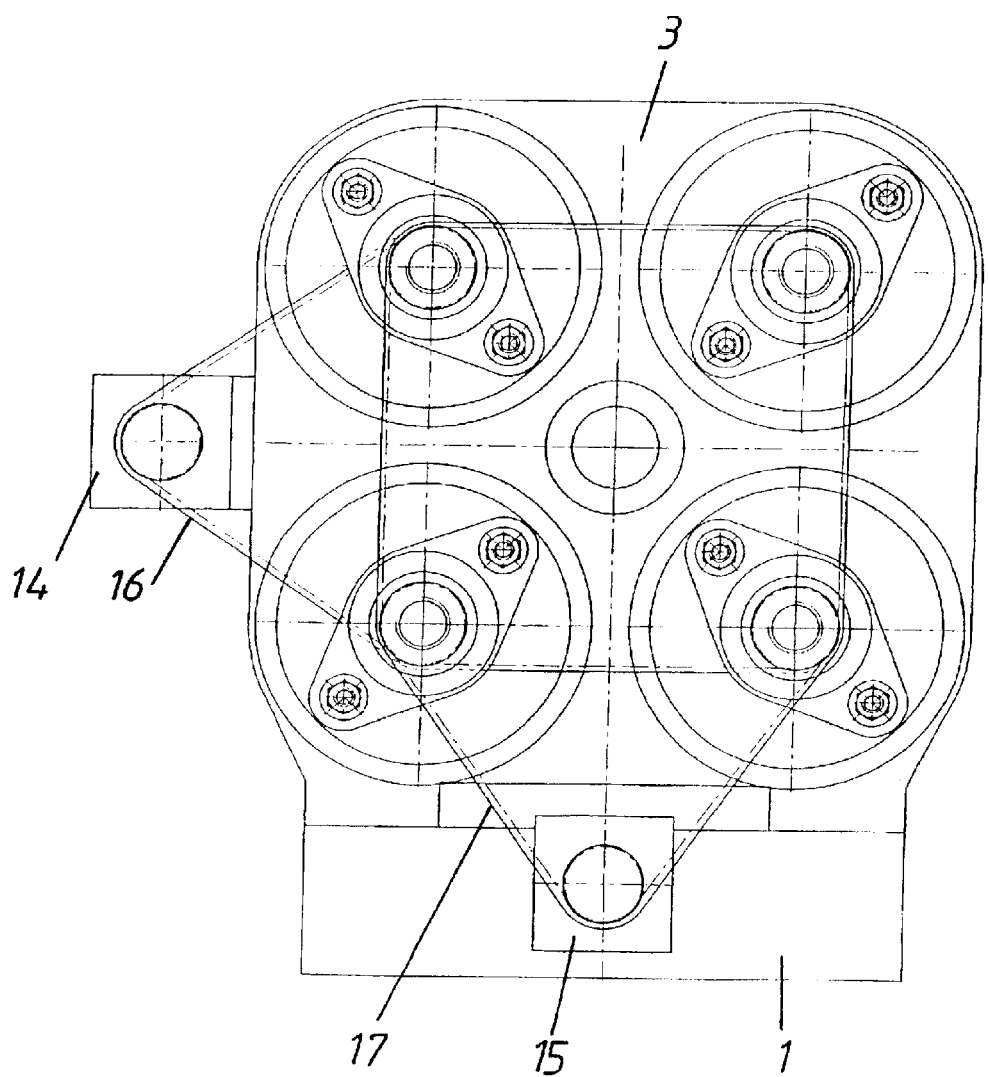
Figure 4:
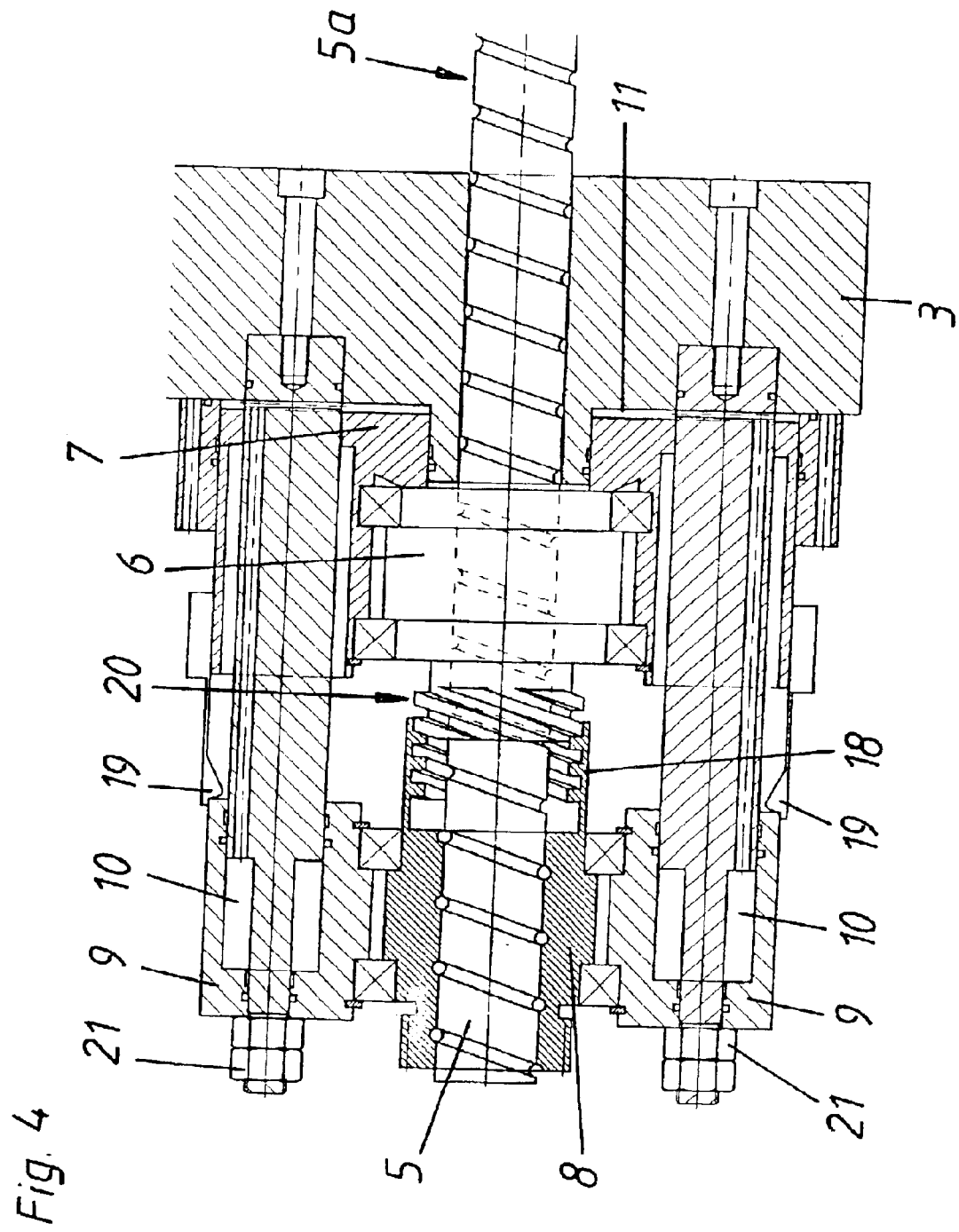
Figure 5:
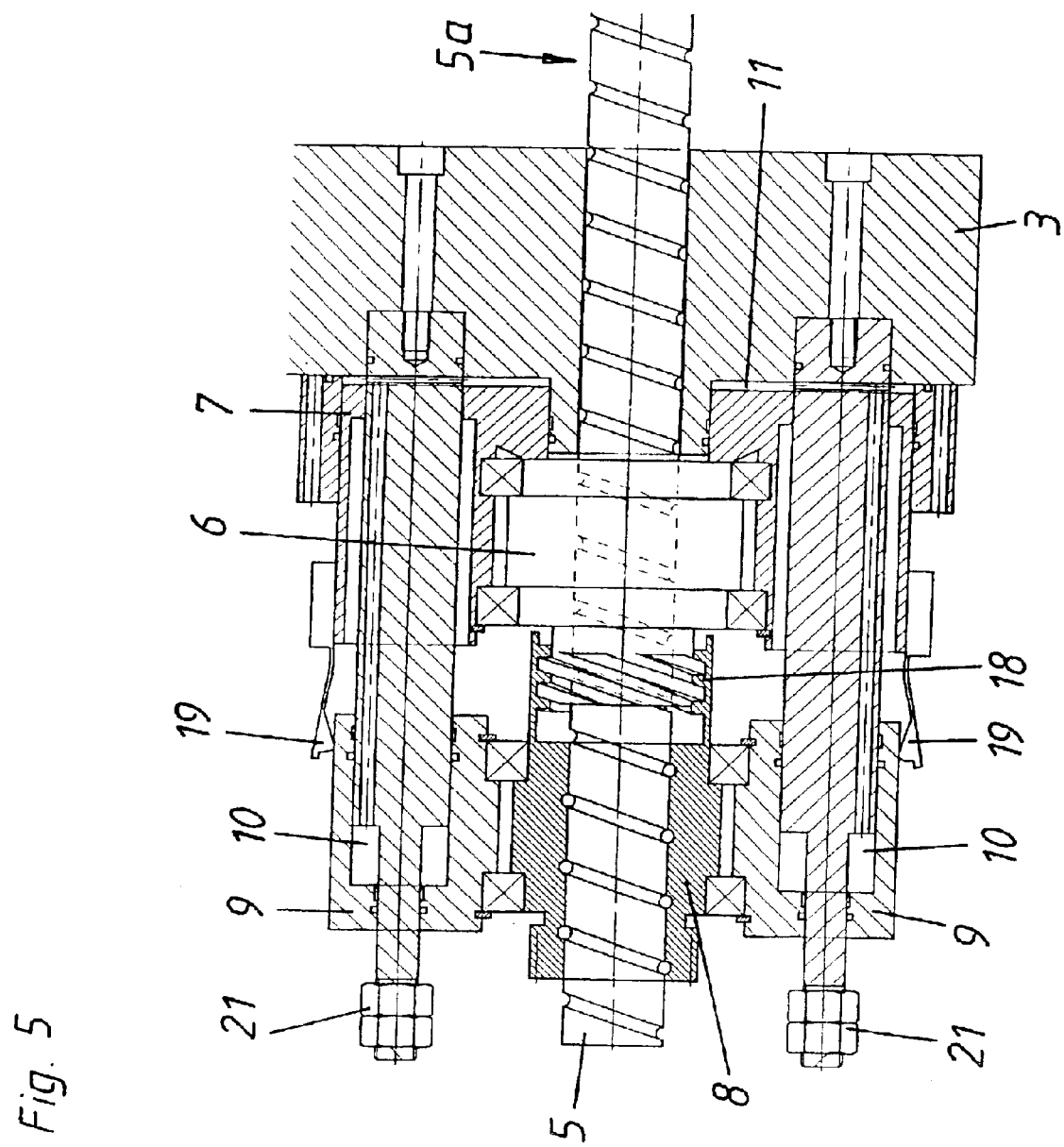
Figure 6:
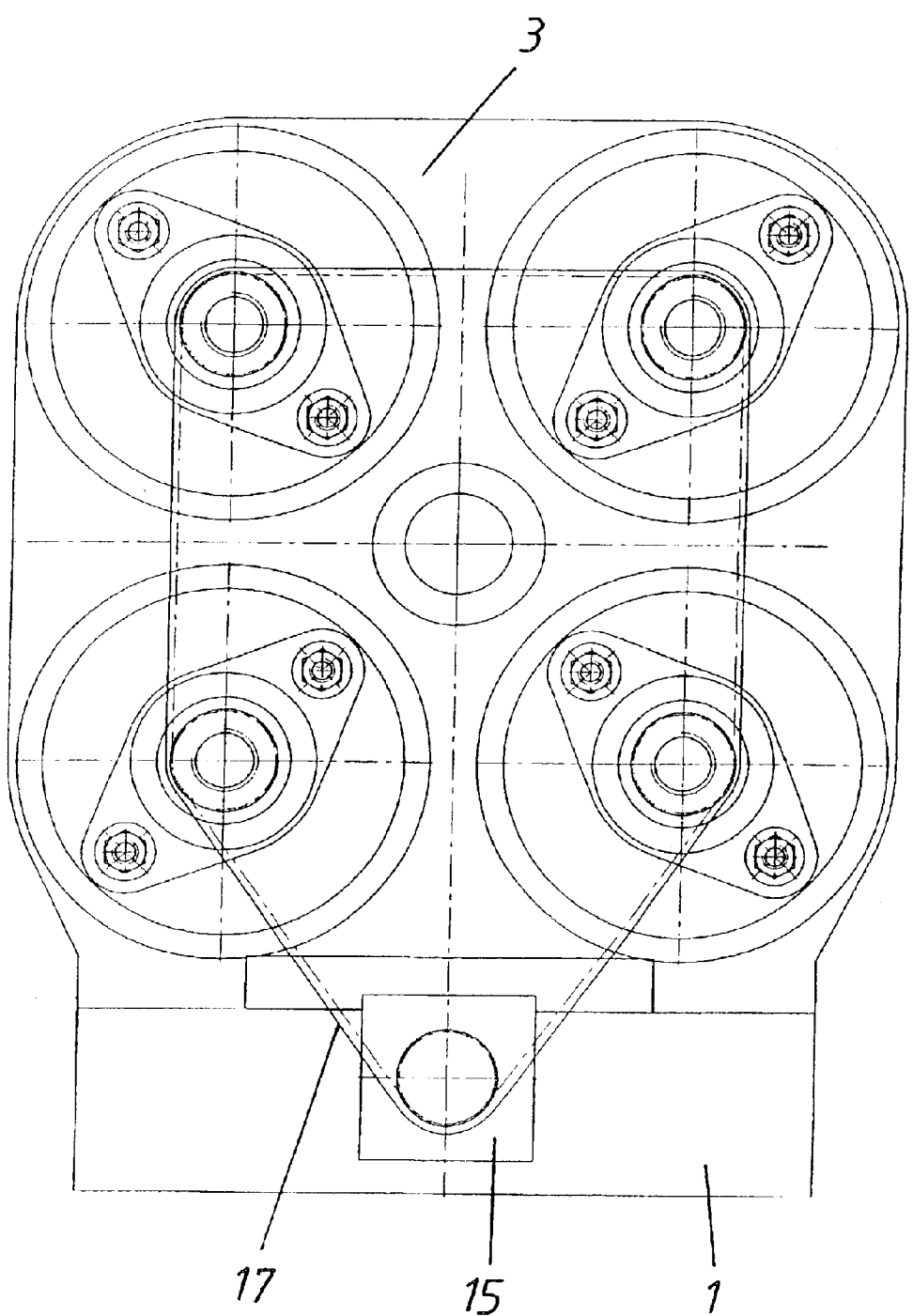

Further features and details of the present invention follow from the following description of the figures. There are shown in:

FIG. 1 a partially cut-away side view of an injection moulding apparatus according to the invention, FIG. 2 a view in the direction of the shafts of a first embodiment, FIG. 3 a view in the direction of the shafts of a further embodiment FIG. 4 a detailed view through the design variant with nuts which can be coupled in a first position, FIG. 5 the construction according to FIG. 4 in a second position and FIG. 6 the view in the direction of the shafts of the construction according to FIGS. 4 and 5.

The injection moulding apparatus according to the invention shown in FIG. 1 has a frame 1 which supports the stationary mould clamping plate 2. The moveable mould clamping plate 3 is housed on tracks 4 on the frame 1 so that it can be moved vis-à-vis the stationary mould clamping plate 2. Four shafts 5 are attached to the stationary mould clamping plate 2, which pass through the openings in the moveable mould clamping plate 3.

In the case of the construction variant shown in FIG. 1, two of the shafts 5 have only one nut 6 for the transmission of the closing force. The nuts 6 engage in the thread 5a of the shafts 5. In the case of the other two shafts 5, which also lie diagonally to one another, according to the invention one drive nut 8 and an additional nut 6 are provided for the transmission of the closing force. The nut 6 for the transmission of the closing force engages in a thread 5a on the shaft 5, whereas the drive nut 8 engages with the thread 5b. The threads 5a and 5b have the same pitch, so that there is no overlapping of the thread courses.

The drive nut 8 is formed as a recirculating ball nut, so that the movement of the moveable mould clamping plate 3 vis-à-vis the stationary mould clamping plate 2 takes place rapidly and largely friction-free. During the rapid stroke, between moveable mould clamping plate 3 and stationary mould clamping plate 2, with which the mould (not shown) is opened and closed, the drive nut 8 and the nut 6 run synchronously. By utilizing the clearance available, it is possible for the force transmission of the closing and opening movement to take place only via the drive nut 8, whilst the nuts 6 follow largely force- and therefore friction-free.

As shown in FIG. 2, the drive of the drive nuts 8 takes place via a servomotor 14. A belt drive 16 ensures synchronization of the two drive nuts 8 arranged diagonally to one another. The second servomotor 15 is responsible for the drive of the nuts 6 for the transmission of the closing force. In this case a belt drive is also provided, which has the reference 17 and synchronizes the rotational movement of the nuts 6. The adjustment of the servomotors 14 and 15 takes place via a control or regulating device which is not shown.

The rapid stroke operating sequence and the application of the closing force is now explained in more detail with reference to FIG. 1. During the rapid stroke, the drive nuts 8 and the nuts 6 run synchronously, while the force transmission takes place via the drive nuts 8 formed as recirculating ball nuts. When the mould has reached the closed state, the drive 15 for the nuts 6 is shut off, which due to the small pitch of the thread 5a leads to an automatic locking of the nuts 6 with the shafts 5. If the drive nuts 8 continue to be rotated via the servomotor 14, this leads to the drive nuts 8 axially approaching the nuts 6. As the drive nuts 8 are housed rotatable in the housing 9 of a pressure transmitter, this approach simultaneously leads to a displacement of the housing 9, reducing the pressure spaces 10. The displaced pressure medium, for example oil, is conveyed via lines 12 into the pressure pads 11 of the associated shaft as well as into the pressure pads 13 of an adjacent shaft 5. With the application of pressure to the pressure pads 11 and 13 the pistons 7 of the pressure pads 11 and 13 lift away from the moveable mould clamping plate 3, taking with them the nuts 6 for the transmission of the closing force housed in the pistons 7. The nuts 6 have a fixed trapezoidal thread and can therefore transmit the closing force to the shafts 5. Due to the small pitch of the thread 5a, during the application of the closing force, a relative movement between the nuts 6 and the shafts 5 ceases, without the servomotor 15 and the belt drive 17 preventing a rotation of the nuts 6.

In the embodiment shown in FIG. 3, in contrast to the embodiment of FIGS. 1 and 2, all the shafts 5 are provided with a nut 6 for the transmission of the closing force, as well as also a drive nut 8. However this changes nothing in the operation described above.

The variant shown in FIGS. 4 to 6 differs more strongly. In this variant only the drive nuts 8, which are provided on all the shafts 5 as well as the nuts 6 for the transmission of the closing force are driven. The drive takes place via a servomotor 15 and an associated drive belt 17. In order to couple the rotational movement of the nuts during the rapid stroke, the drive nuts 8 are provided with a tubular extension 18, which has an internal thread. Corresponding to this internal thread, a short section with an external thread 20 is provided on the shafts 5. For the distancing of the nuts 6 and 8 spring tongues 19 are provided. If the drive nuts 8 are rotated, they take the nuts 6 with them. If the mould arranged between the mould clamping plates reaches its closed state, the forces occurring between the shafts 5 and the nuts 6 for the transmission of the closing force immediately increase, so that the nuts 6, due to the friction arising, come to a standstill. The drive nuts 8, which continue to be driven, overcome the resilience of the spring tongues 19 and axially approach the nuts 6. The thread 20 is adapted in pitch to the thread 5a. In this way, after overcoming the resilience of the spring tongues 19, the respective drive nut 8 can axially approach the nut 6.

As in the first embodiment the drive nuts 8, in their axial movement, take the housing 9 of the pressure transmission device with them, reducing the pressure spaces 10. Via the lines 12 the pressure medium flows into the pressure pads 11 and lifts the pistons 7 together with the nuts 6 away from the moveable mould clamping plate 3.

In the opposite direction of movement, the drive nuts 8 begin to turn first, so that the distance between the nuts 6 and the drive nuts 8 is in turn increased. The drive nuts 8 can move axially away from the nuts 6, until the housing 9 of the pressure transmission devices stops against the end nuts 21. As soon as this position is reached, the spring tongues 19 snap back to their original position. Via the coupling in the region of the thread 20 the nuts 6 are now rotated during the opening rapid stroke synchronously with the drive nuts 8.

What is claimed is:

1. Injection moulding apparatus with a stationary mould clamping plate and a moveable mould clamping plate as well as shafts fixed to one of said mould clamping plates and passing through openings in the other mould clamping plate, characterized in that at least one of the shafts has at least one thread on its free end, whereby at least on this free end of the one shaft a drive nut as well as an additional nut for the transmission of the closing force are arranged.

2. Injection moulding apparatus according to claim 1, characterized in that the drive nut is formed as a recirculating ball nut.

3. Injection moulding apparatus according to claim 1, characterized in that additional nut has a fixed thread for the transmission of the closing force.

4. Injection moulding apparatus according to claim 1, characterized in that additional nut has a trapezoidal thread for the transmission of the closing force.

5. Injection moulding apparatus according to claim 1, characterized in that the drive nut and the additional nut for the transmission of the closing force engage in different threads on the shaft.

6. Injection moulding apparatus according to claim 1, characterized in that the drive nut and the additional nut for the transmission of the closing force engage in a shared thread on the shaft.

7. Injection moulding apparatus according to claim 1, characterized in that it comprises at least one pressure pad for the application of the closing force with a piston and in that the additional nut for the transmission of the closing force is housed rotatable on said piston of said pressure pad.

8. Injection moulding apparatus according to claim 7, characterized in that the drive nut is arranged to apply pressure to the pressure pad for the application of the closing force.

9. Injection moulding apparatus according to claim 1, characterized in that the drive nut as well as the additional nut for the application of the closing force each have their own drive.

10. Injection moulding apparatus according to claim 1, characterized in that the drive nut as well as the additional nut for the application of the closing force each have their own electric drive.

11. Injection moulding apparatus according to claim 1, characterized in that the drive nut as well as the additional nut for the transmission of the closing force can be coupled.

12. Injection moulding apparatus according to claim 11, characterized in that only the drive nut has a drive.

13. Injection moulding apparatus according to claim 12, characterized in that the drive is an electric drive.

14. Injection moulding apparatus according to claim 1, characterized in that two shafts arranged diagonally to one another or all the shafts have at least one thread on their free ends, while drive nuts as well as additional nuts for the transmission of the closing force are arranged on the two shafts arranged diagonally to one another or on all the shafts.

15. Injection moulding apparatus according to claim 14, characterized in that the drive nuts are synchronized.

16. Injection moulding apparatus according to claim 15, characterized in that a belt drive is provided for the synchronization.

* * * * *